US008004544B1

(12) United States Patent
Zhang et al.

(10) Patent No.: US 8,004,544 B1
(45) **Date of Patent: *Aug. 23, 2011**

(54) FUZZY LOGIC BASED LCD OVERDRIVE CONTROL METHOD

(75) Inventors: Hongmin Zhang, Santa Clara, CA (US); Tianhua Tang, San Jose, CA (US)

(73) Assignee: Pixelworks, Inc., Portland, OR (US)

( * ) Notice: Subject to any disclaimer, the term of this patent is extended or adjusted under 35 U.S.C. 154(b) by 975 days.

This patent is subject to a terminal disclaimer.

(21) Appl. No.: 11/867,628

(22) Filed: Oct. 4, 2007

Related U.S. Application Data

(63) Continuation of application No. 10/931,312, filed on Aug. 31, 2004, now Pat. No. 7,405,741.

(51) Int. Cl.
*G06F 15/18* (2006.01)
*G09G 3/36* (2006.01)

(52) U.S. Cl. .......... 345/690; 345/204; 345/503; 706/22; 706/908

(58) Field of Classification Search .................. 345/690, 345/204, 503, 583; 706/1–9, 22, 908
See application file for complete search history.

(56) References Cited

U.S. PATENT DOCUMENTS

| | | | | |
|---|---|---|---|---|
| 4,878,178 | A * | 10/1989 | Takakura et al. | 345/589 |
| 4,935,806 | A | 6/1990 | Rabii | |
| 5,305,424 | A | 4/1994 | Ma et al. | |
| 5,347,382 | A | 9/1994 | Rumbaugh | |
| 5,488,434 | A | 1/1996 | Jung | |
| 5,548,697 | A | 8/1996 | Zortea | |
| 5,799,111 | A | 8/1998 | Guissin | |
| 6,016,154 | A | 1/2000 | Moroo et al. | |
| 6,084,981 | A | 7/2000 | Horiba et al. | |
| 6,157,396 | A | 12/2000 | Margulis et al. | |
| 6,466,225 | B1 | 10/2002 | Larkin et al. | |
| 6,546,124 | B1 | 4/2003 | Hopple et al. | |
| 6,571,224 | B1 | 5/2003 | He et al. | |
| 6,792,160 | B2 | 9/2004 | Shaw et al. | |
| 7,012,618 | B2 | 3/2006 | Pau et al. | |
| 7,032,045 | B2 | 4/2006 | Kostadinov | |
| 7,038,647 | B2 * | 5/2006 | Shigeta et al. | 345/89 |
| 7,079,287 | B1 | 7/2006 | Ng et al. | |
| 7,262,818 | B2 | 8/2007 | Chuang et al. | |
| 7,271,851 | B2 | 9/2007 | Lin et al. | |
| 2002/0050965 | A1 | 5/2002 | Oda et al. | |
| 2003/0026494 | A1 | 2/2003 | Woodell et al. | |
| 2003/0072496 | A1 | 4/2003 | Woodell et al. | |
| 2005/0248687 | A1 | 11/2005 | Lee et al. | |
| 2007/0115298 | A1 | 5/2007 | Credelle et al. | |

FOREIGN PATENT DOCUMENTS

| | | |
|---|---|---|
| EP | 0424890 | 5/1991 |
| EP | 0424890 A2 * | 5/1991 |
| WO | 9616505 | 5/1996 |

* cited by examiner

*Primary Examiner* — Bipin Shalwala
*Assistant Examiner* — Kelly B Hegarty
(74) *Attorney, Agent, or Firm* — Marger Johnson & McCollom PC

(57) ABSTRACT

A boost table stores adjusted target levels for pairs of original and target pixel levels. The adjusted target levels can be used to as a substitute for the target pixel level to improve pixel response in reaching the desired target pixel level. A reduced boost table can be used, storing a subset of the adjusted target levels. Fuzzy logic control rules can be used to calculate adjusted target levels not actually stored in the reduced boost table.

35 Claims, 11 Drawing Sheets

Boost Table

305

| | | Target Pixel Level | | | | | | | | |
|---|---|---|---|---|---|---|---|---|---|---|
| | | 0 | 1 | 2 | 3 | ... | 68 | 69 | ... | 255 |
| Original Pixel Level | 0 | 0 | 1 | 2 | 4 | | 170 | 171 | | 255 |
| | 1 | 0 | 1 | 1 | 4 | | 169 | 170 | | 255 |
| | 2 | 0 | 0 | 2 | 4 | | 168 | 169 | | 255 |
| | 3 | 0 | 0 | 1 | 3 | | 168 | 168 | | 255 |
| | ... | | | | | ... | | | | |
| | 68 | 0 | 0 | 0 | 0 | | 68 | 68 | | 255 |
| | 69 | 0 | 0 | 0 | 0 | | 69 | 69 | | 255 |
| | ... | | | | | | | | ... | |
| | 255 | 0 | 0 | 0 | 0 | | 8 | 8 | | 255 |

FIG. 3

Boost Table

405

| Original Pixel Level \ Target Pixel Level | 0 | 31 | 63 | 95 | 127 | 159 | 191 | 223 | 255 |
|---|---|---|---|---|---|---|---|---|---|
| 0 | 0 | 82 | 170 | 194 | 214 | 226 | 238 | 248 | 255 |
| 31 | 0 | 32 | 122 | 156 | 182 | 204 | 226 | 242 | 255 |
| 63 | 0 | 14 | 64 | 116 | 156 | 188 | 216 | 239 | 255 |
| 95 | 0 | 8 | 48 | 96 | 144 | 180 | 212 | 237 | 255 |
| 127 | 0 | 0 | 30 | 66 | 128 | 170 | 206 | 234 | 255 |
| 159 | 0 | 0 | 20 | 50 | 112 | 160 | 200 | 232 | 255 |
| 191 | 0 | 0 | 14 | 32 | 92 | 148 | 192 | 228 | 255 |
| 223 | 0 | 0 | 10 | 24 | 64 | 134 | 184 | 224 | 255 |
| 255 | 0 | 0 | 8 | 16 | 44 | 116 | 172 | 218 | 255 |

FIG. 4

| Control Rules | |
|---|---|
| Antecedent Block | Consequent Block |
| If x is A(x) = 1-x | Then z is TL |
| If x,y is B(x,y) = x-y | Then z is TR |
| If y is C(y) = y | Then z is BR |
| If x is D(x) = x | Then z is BR |
| If x,y is E(x,y) = y-x | Then z is BL |
| If y is F(y) = 1-y | Then z is TL |

Rows 1–3: x,y in 510
Rows 4–6: x,y in 515

515

| Control Rules | |
|---|---|
| Antecedent Block | Consequent Block |
| If x is A(x) = 1-x | Then z is TL |
| If x,y is B(x,y) = x-y | Then z is TR |
| If y is C(y) = y | Then z is BR |
| If x is D(x) = x | Then z is BR |
| If x,y is E(x,y) = y-x | Then z is BL |
| If y is F(y) = 1-y | Then z is TL |

FUZZY LOGIC BASED LCD OVERDRIVE CONTROL METHOD

RELATED APPLICATION DATA

This application is a continuation of U.S. patent application Ser. No. 10/931,312, filed Aug. 31, 2004, titled "FUZZY LOGIC BASED LCD OVERDRIVE CONTROL METHOD", now U.S. Pat. No. 7,405,741, issued Jul. 29, 2008 which is related to commonly-assigned U.S. patent application Ser. No. 10/931,439, filed Aug. 31, 2004, titled "YUV COMPRESSION FOR BOOST", now U.S. Pat. No. 7,443,370, issued Oct. 28, 2008, all of which are herein incorporated by reference in their entirety for all intents and purposes.

FIELD OF THE INVENTION

This invention pertains to liquid crystal displays, and more particularly to improving performance in liquid crystal displays.

BACKGROUND OF THE INVENTION

In the last few years, liquid crystal displays (LCDs) have jumped from being a small player to a dominant force in displays. First seen as monitors for computers, LCDs have advantages over cathode ray tube (CRT) displays. LCDs have a much smaller thickness, as they do not need the space or equipment to support the electron gun used in a CRT. This means that LCD displays could be used in places where a CRT was too bulky to fit neatly. The omission of the electron gun also lightened the display, meaning that an LCD is considerably lighter than a comparably sized CRT.

LCDs also have some disadvantages. The first disadvantage that most people think of is cost. An LCD usually costs more than a comparably sized CRT monitor. But as manufacturing has scaled up, cost is becoming less of an issue.

A second disadvantage of early model LCDs is their viewing angle. Whereas CRTs can be viewed from almost angle that provides a line of sight with the screen, LCDs tend to have narrower viewing angles. If an LCD is viewed from outside its ordinary viewing angle, even if the screen is in a direct line of sight, the screen is essentially unreadable. Manufacturing has begun to address this problem, and LCDs today have viewing angles that are almost as good as CRT displays.

A third disadvantage is pixel responsiveness. In a CRT display, the electron gun generates an electron stream, which is directed to each pixel in turn. The pixels (actually a combination of three differently colored dots: usually one each of red, green, and blue) respond: the phosphors show the desired color. The time it takes for each pixel to respond to the electron stream is very small: typically less than 12 milliseconds (ms). And because the pixels begin to lose their color fairly quickly after being energized by the electron stream, the electron gun paints the entire surface of the display roughly 30 times per second. All this means that pixels in a CRT display respond very quickly to changes.

LCDs, in contrast, rely on polarized light to operate. Two polarized filters sandwich pixels. The two polarized filters are at 90° to each other. Because polarized filters block all light that is not at the correct angle, without the operation of the pixel, all light would be blocked. In its normal state, the pixel includes layers of molecules that twist the light 90°, so that light leaves the pixel oriented correctly relative to the second polarized filter. To change the amount of light passing through the pixel, a current is applied. The current untwists the pixel, meaning that light leaves the pixel at the same angle it had upon entering the pixel, and the second polarized filter blocks the light from being visible. But compared with CRTs, pixels in LCDs respond slowly: average response time is around 20 ms.

When used as computer monitors, the slow response time of LCDs is not a significant impediment, because typical computer use does not require pixels to change quickly. But as LCDs have begun to be used for video (e.g., to display digital video discs (DVDs) or as televisions), the slow response time of LCDs produces a noticeable effect. Images are blurred, especially where the pixels have to change values quickly (e.g., when there is fast action on the display).

Aware of this problem, manufacturers have attempted to improve pixel responsiveness by focusing on the materials. Changes to the liquid used in the liquid crystals can help to some extent. But there are limits to the responsiveness of any material used, and more advanced materials are also more expensive to manufacture.

Accordingly, a need remains for a way to improve pixel performance in LCDs without resorting to different materials that addresses these and other problems associated with the prior art.

SUMMARY OF THE INVENTION

The invention includes a boost table. The boost table includes boost values. The boost table is indexed indices representing the original and target pixel levels. Once a boost value has been determined, the target pixel level can be adjusted by the boost value, to improve the performance of the device.

In one embodiment of the invention, the boost table includes a subset of all possible original and target pixel levels. To determine the boost value for a combination of original and target pixel levels not in the boost table, the boost value can be computed using fuzzy logic.

The foregoing and other features, objects, and advantages of the invention will become more readily apparent from the following detailed description, which proceeds with reference to the accompanying drawings.

BRIEF DESCRIPTION OF THE DRAWINGS

FIG. 3 shows a table of adjusted target levels, such as the new target level of FIG. 2, according to an embodiment of the invention.

FIG. 4 shows a reduced version of the boost table of FIG. 3, according to an embodiment of the invention.

DETAILED DESCRIPTION OF THE PREFERRED EMBODIMENT

Figure 1:
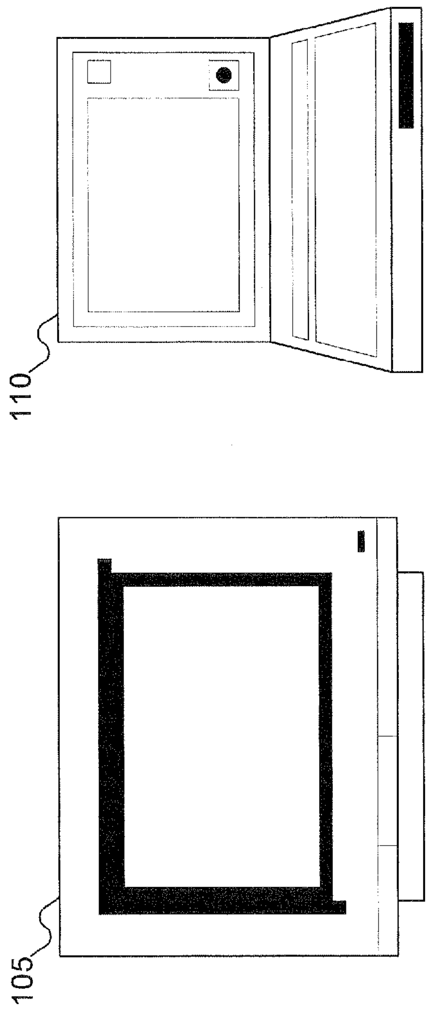
FIG. 1 shows devices to which embodiments of the invention can be adapted.

FIG. 1 shows devices to which embodiments of the invention can be adapted. FIG. 1 shows display 105 and laptop computer 110. Display 105 can be a computer monitor, or it can be a television display. Display 105 and laptop computer 110 are not necessarily connected; they are simply examples of devices that can benefit from the improved pixel response that is a consequence of the invention. Display 105 and laptop computer 110 (more specifically, the display built in to laptop computer 110) are typically devices using Liquid Crystal Display (LCD) displays, but a person skilled in the art will recognize that other devices that might benefit from embodiments of the invention. Examples of pixelated displays that might benefit from embodiments of the invention include active and passive LCD displays, plasma displays (PDP), field emissive displays (FED), electro-luminescent (EL) displays, micro-mirror technology displays, low temperature polysilicon (LTPS) displays, and the like for use in television, monitor, projector, hand held, and other like applications.

Figure 2:
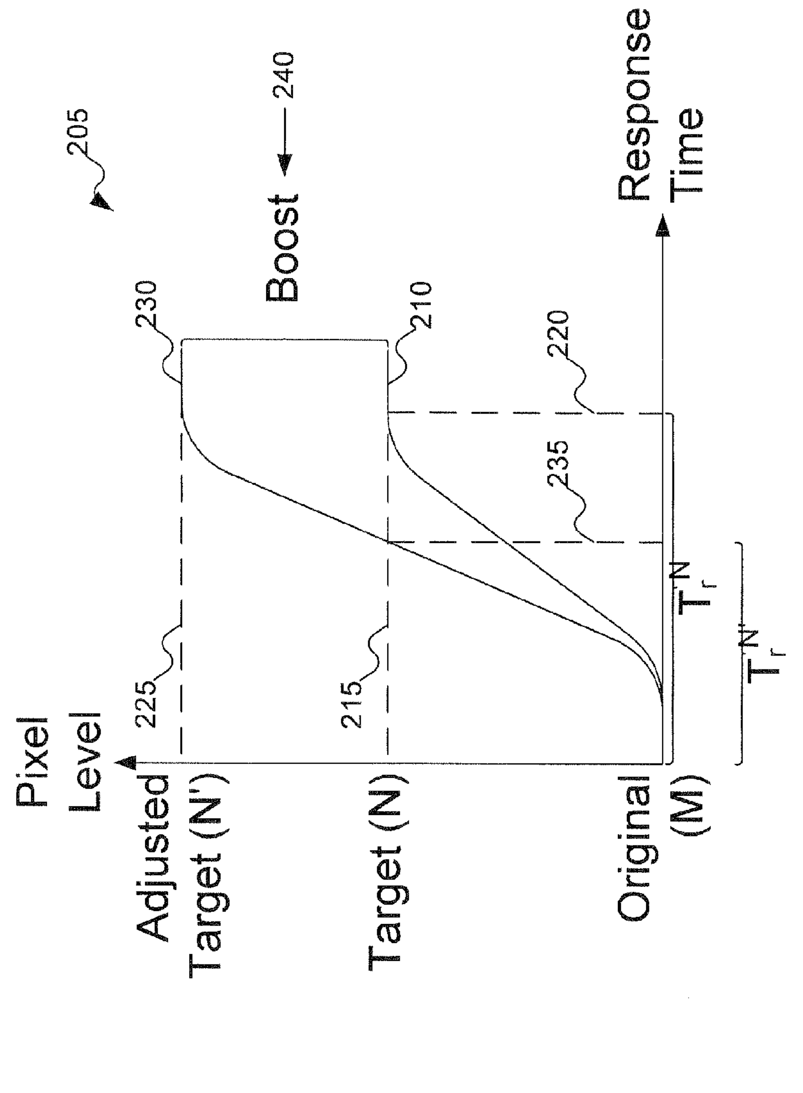
FIG. 2 shows a graph of how boost values can be used to improve pixel performance, according to an embodiment of the invention.

FIG. 2 shows an example of the response time for a pixel in a liquid crystal display (LCD). In FIG. 2, graph 205 shows the rate of change of a pixel over time. Curve 210 shows the rate of change from an original pixel level (M) in a current frame to a target pixel level (N) in a subsequent frame. As can be seen, the curve shows not an instantaneous change, but rather a gradual change. The change takes a little time to get started at the beginning, reaches a relatively steady pace at the middle, then slows down at the end to stop at the desired target level. Target level N 215 is reached at time $T_r^N$ 220. As discussed above, $T_r^N$ 220 is typically on the order of 20 ms, although the exact value for $T_r^N$ 220 depends on many factors, including the materials used, the difference between the original and target pixel levels, the design of the LCD, etc.

To bring response time $T_r^N$ 220 down to a quicker response time $T_r^{N'}$, an embodiment changes the target level. Thus, rather than instructing the pixel to change to target level N 215, a new target level N' 225 can be selected. As can be seen by curve 230, the time it takes to change the pixel from original level M to new target level N' 225 is comparable (if perhaps not identical) to the time required to change to target level N 215. But because new target level N' 225 is selected to be further from original level M than target level N 215, target level N 215 is reached faster. (Note that target level N 215 is reached in the course of changing the pixel to target level N' 225.) Specifically, target level N 215 is reached at time $T_r^{N'}$235, which is a quicker response time than $T_r^N$ 220.

The question then remains, whether $T_r^{N'}$ 235 is fast enough: that is, is $T_r^{N'}$ 235 less than 12 ms? The answer is, it depends on the selected value for new target level N' 225. Given an original level M and a target level N 215, it might not be possible to find a new target level N' 225 such that response time $T_r^{N'}$ 235 is less than 12 ms. But if a new target level N' 225 can be found such that response time $T_r^{N'}$ is less than 12 ms., then by having the pixel change to new target level N' 225, the visible response of the pixel is improved.

Once a new target level N' 225 has been determined, boost 240 can be computed. Boost 240 is simply the difference between the target level N 215 and the new target level N' 225. Then, whenever a pixel needs to move from target level M to target level N 215, the target level can be increased by boost 240 to improve the visible response of the pixel.

Although graph 205 shows the response of a pixel as it moves from a lower level to a higher level, a person skilled in the art will recognize that boosts can be computed for pixels moving from higher levels to lower levels. In that situation, the curve is (roughly) reflected around the Response Time axis, so that the curve moves from a higher level to a lower level. The boost then represents the difference between the target level N and the (lower) new target level N'.

Determining which values for new target level N' 225 can be used is an experimental process, and should be performed for each pair of possible original and target levels. But assuming that the manufacture of the LCD is constant for all LCDs of the same design, then the experiment can be conducted once, and the boost values can be used for all LCDs of that manufacture. In this situation, the boost values are preferably stored as a table readable by the LCD (e.g., hard-coded into a chip, or stored in firmware in the LCD). The LCD can then perform a lookup of the original and target levels in the table, determine the appropriate boost value, and adjust the target level by the boost value.

The size of the table depends on the number of levels for each pixel. Modern computers typically show "true color," which is defined as 24-bit color depth. That is, for each pixel, 8 bits are used to control the level of red in the pixel, 8 bits are used to control the level of blue in the pixel, and 8 bits are used to control the level of green in the pixel. With LCDs, each pixel is usually divided into 3 sub-pixels: one each for red, blue, and green color. This means that each sub-pixel uses 8 bits to represent the level of the pixel. As $2^8=256$, there are 256 levels for each pixel/sub-pixel. This means that the table needs 256 rows and 256 columns, or 256×256=65,536 entries. If each entry holds 8 bits=1 byte of data (for the boost value), this means that the table requires 65,536 bytes of space. A person skilled in the art will recognize that different table sizes and dimensions can be used for different color depths than "true color."

FIG. 3 shows a table of adjusted target levels, such as the new target level of FIG. 2, for a boost table, according to an embodiment of the invention. Table 305 shows many different adjusted target levels, corresponding to different original and target pixel levels. That is, given a particular original pixel level and target pixel level, the appropriate entry in table 305 represents the new target pixel level to use. In other words, an entry in table 305 represents the original target level adjusted by the appropriate boost value. As can be observed in table 305, where the original pixel level is larger than the target pixel level, the adjusted target level is lower than the original pixel level: that is, the boost value reduces the target pixel level.

Although table 305 is shown as storing adjusted pixel levels, a person skilled in the art will recognize that table 305 can be stored differently. For example, instead of storing the adjusted pixel level, table 305 can store the boost value. If the target pixel level is greater than the original pixel level, then the boost value can be added to the target pixel level. If the target pixel level is lower than the original pixel level, then table 305 can store a negative boost value, in which case the boost value is always added to the target pixel level, or table 305 can store a positive boost value, in which case the boost value is subtracted from the target pixel level. Storing a positive boost value when the target pixel level is lower than the original pixel level can simplify implementation of table 305, at the cost of increasing the complexity of use for the boost value. As shown, because table 305 stores adjusted pixel levels, no arithmetic is needed alter the appropriate entry in table 305 is located. A person skilled in the art will recognize that table 305 can also be organized differently: for example, the original pixel level can be used to locate the appropriate column in table 305, and the target pixel level the appropriate row.

In table 305, it is assumed that each pixel uses eight bits to encode the pixel levels, resulting in 256 possible entries for each pixel level. But a person skilled in the art will recognize that any number of original and target pixel levels can be used, even (theoretically) resulting in tables that are not square (i.e., different dimensions for the original and target pixel levels). In addition, where the pixels in question are color sub-pixels, table 305 can represent the boost values for just one color (e.g., red in a red-green-blue color scheme), with a different boost table storing boost values for other colors.

In table 305, each adjusted target level is stored using eight bits. With 256 possible original and target pixel levels, there are 256×256=65,536 entries needed for table 305; at eight bits per entry, that amounts to 524,288 bits for table 305. This means that table 305 is fairly large. As it is preferable to keep table size small, it is desirable to find a way to reduce the amount of data in table 305. FIG. 4 shows a version of table 305, but with a smaller size. Instead of 256 rows and 256 columns, table 405 only has 9 rows and 9 columns. This means that the total space required for table 405 is 9×9×8=648 bits: a reduction of more 99%! (Although FIG. 4 shows table 405 with only nine rows and nine columns, and using only eight hits per adjusted target level, a person skilled in the art will recognize that all of these parameters are tunable as desired. Thus, table 405 can have any number of rows or columns, the number of rows and columns do not have to match, and any number of bits can be used per adjusted target level.)

The rows and columns from table 305 included in table 405 can be selected in any manner desired. Typically, the rows and columns are selected so as to be evenly spaced from within table 305, but a person skilled in the art will recognize other ways in which rows and columns can be selected.

Of course, because table 405 omits certain entries present in table 305, not all pairs of original and target pixel levels can be used to directly access table 405. For example, if the original pixel level is 1 and the target pixel level is 68, table 305 provides for an boost adjusted target level of 169; table 405 cannot immediately provide a boost value. Thus, the appropriate boost value must be inferred from the available data. While interpolation could be used to determine the appropriate boost value, another technique also exists.

Figure 5:
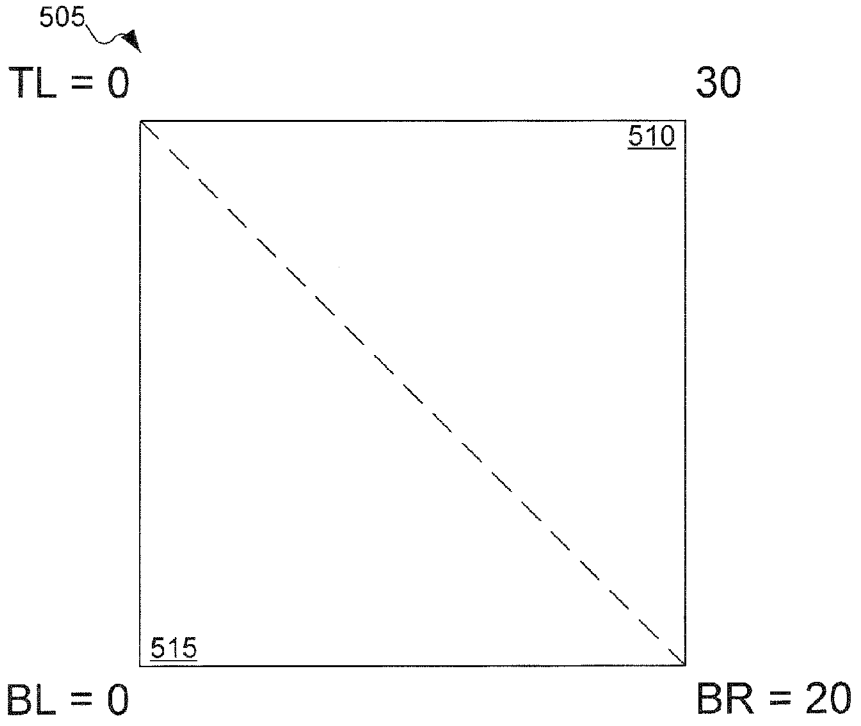
FIGS. 5-6 show the use of fuzzy logic rules to compute determine the boost value in the reduced boost table of FIG. 4, according to an embodiment of the invention.
Figure 6:
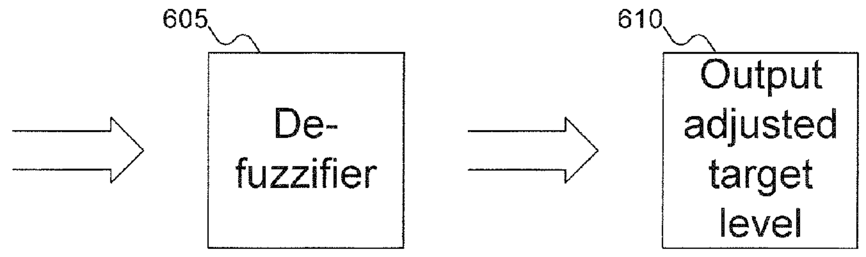

Instead of interpolating to determine the adjusted target level, fuzzy logic can be used. FIGS. 5-6 show the use of fuzzy logic rules to determine the adjusted target level in the reduced boost table of FIG. 4, according to an embodiment of the invention. The fuzzy logic control rules can be stored in a storage medium. To begin with, the upper and lower bounds for the original and target pixel levels are determined. For example, assume that the original pixel level is 150, and the target pixel level is 43. Since no row or column within table 405 is indexed by either of these two levels, accessing table 405 cannot directly determine the adjusted target level. To start the determination of the adjusted target level, the two closest levels to the original pixel level that index rows in table 405 are determined. These would be original pixel levels 127 and 159. Similarly, the two closest levels to the target pixel level that index columns in table 405 are determined. These would be target pixel levels 31 and 63. The intersections of these two rows and two columns in table 405 form box 505 in FIG. 5. (The letters "T," "B," "L," and "R" stand for "top," "bottom," "left," and "right," respectively; thus, for example, "TL" refers to the top left corner of box 505.)

Box 505 is divided into two triangular regions 510 and 515. The combination of the original and target pixel levels places the desired boost value in one of these triangular regions 510 and 515. In one embodiment, the appropriate triangular region to use is a matter of algebra, but a person skilled in the art will recognize other ways in which the appropriate triangular region can be selected. The determination of which of triangular regions 510 and 515 controls which fuzzy logic control rules are applied. If the desired boost value is in triangular region 510, then the control rules of Table 1 are applied; if the desired boost value is in triangular region 515, then the control rules of Table 2 are applied. (In Tables 1 and 2, "x" refers to the original pixel level and "y" refers to the target pixel level.)

TABLE 1

| Antecedent Block | Consequent Block |
|---|---|
| If x is A(x) = 1 − x | Then z is TL |
| If x, y is B(x, y) = x − y | Then z is TR |
| If y is C(y) = y | Then z is BR |

TABLE 2

| Antecedent Block | Consequent Block |
|---|---|
| If x is D(x) = x | Then z is BR |
| If x, y is E(x, y) = y − x | Then z is BL |
| If y is F(y) = 1 − y | Then z is TL |

Fuzzy logic is a generalization of classical set theory. Whereas classical set theory allows for only two possible values in determining whether an element is a member of a set (specifically, "Yes" and "No"), fuzzy logic permits elements to be partial members of sets. The functions A-F shown above mathematically define the membership functions, with a value of "1" indicating an element is absolutely a member of the set, and a value of "0" indicating that an element is absolutely not a member of the set. (A person skilled in the art will recognize that the original and target pixel levels (that is, "x" and "y" may need to be scaled appropriately before the rules can be applied.)

The control rules are all applied at the same time; the consequent blocks define the output values. But, as is common in fuzzy logic, multiple control rules can each "fire" at the same time. That is, the antecedent basis of multiple control rules can be satisfied simultaneously, resulting in multiple output values. Before a final value can be determined, these values must be combined.

There are several standard techniques used to combine the outputs from multiple control rules in fuzzy logic. Some of the more common techniques include MAX-MIN (selecting the output of the rule with the highest magnitude), MAX-PRODUCT (scaling the outputs and forming a union of their combined areas), AVERAGING (forming the average of the outputs), and ROOT-SUM-SQUARE (which combines the above rules). In a preferred embodiment of the invention, a weighted average of the outputs of the control rules is used.

Referring now to FIG. 6, once the outputs of the control rules have been combined, the result must be "de-fuzzified." De-fuzzification is the process of taking the combined output from the fuzzy logic control rules and returning a single mathematical value. Because fuzzy logic permits partial set memberships, the outputs of the control rules are not individual numbers, but rather fuzzy sets themselves. De-fuzzification is the process of converting the fuzzy set back to an individual number. The fuzzy centroid of the combined outputs is computed using defuzzifier 605: this fuzzy centroid is output adjusted target pixel level 610.

Figure 7:
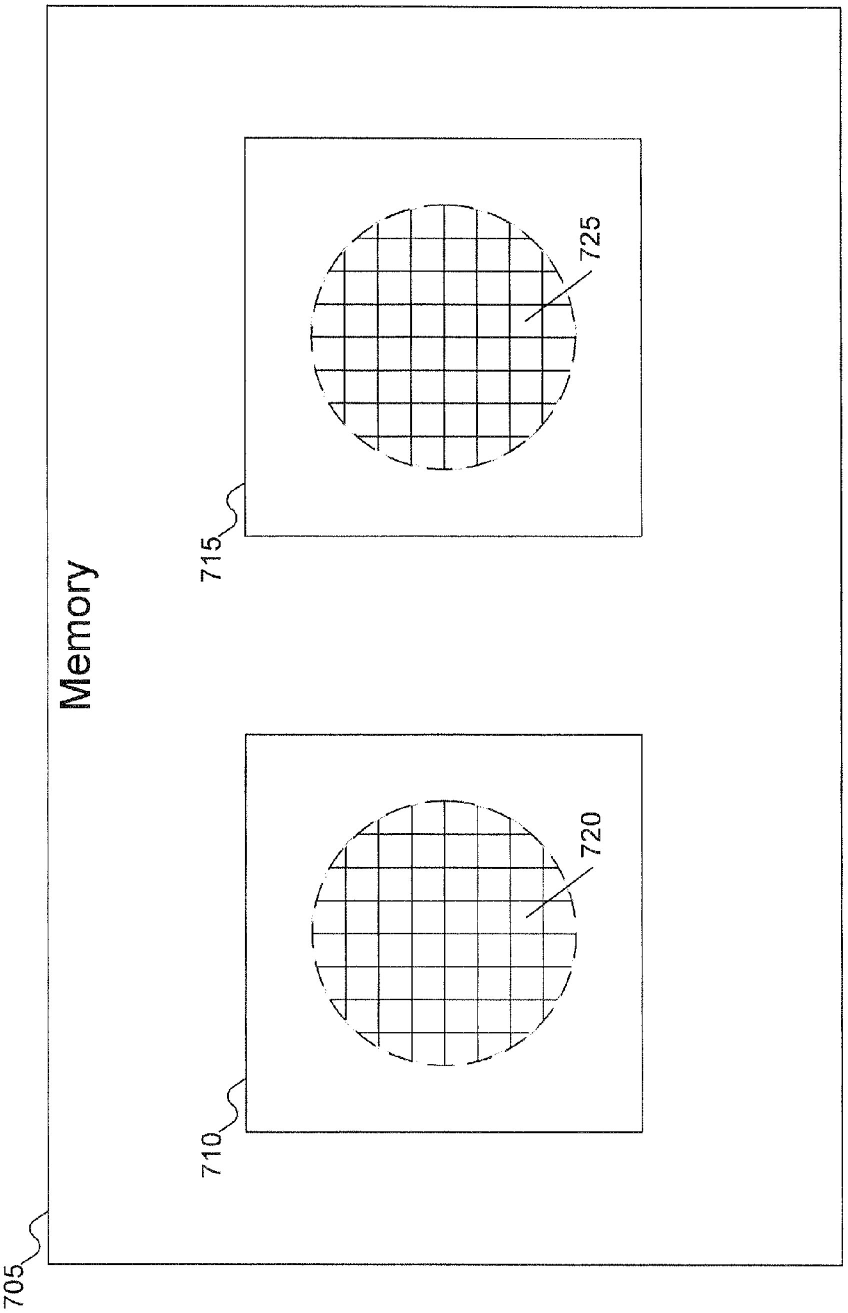
FIG. 7 shows two frames of video stored in memory for which a boost value can be computed, according to an embodiment of the invention.

The reader may be wondering where the original and target pixel levels are coming from. FIG. 7 explains one possible source for this information. In FIG. 7, memory 705 is shown. Memory 705 can be part of the device with the display, or it can be physically elsewhere, as desired. Within memory 705, two frames 710 and 715 for presentation on the display are shown. Frames 710 and 715 might be individual frames of animation, they might be sequential images of a slide show, or they might be part of a video signal being received by the device; a person skilled in the art will recognize other possible interpretations of FIG. 7. Within each of frames 710 and 715 are individual pixels, a few of which are shown. Pixels 720 and 725 represent the same location within frames 710 and 715 to be displayed at the same pixel on the device. Each of pixels 720 and 725 has a level; assuming that frame 710 comes before frame 715, the level of pixel 720 is the original pixel level and level of pixel 725 is the target pixel level.

Figure 8:
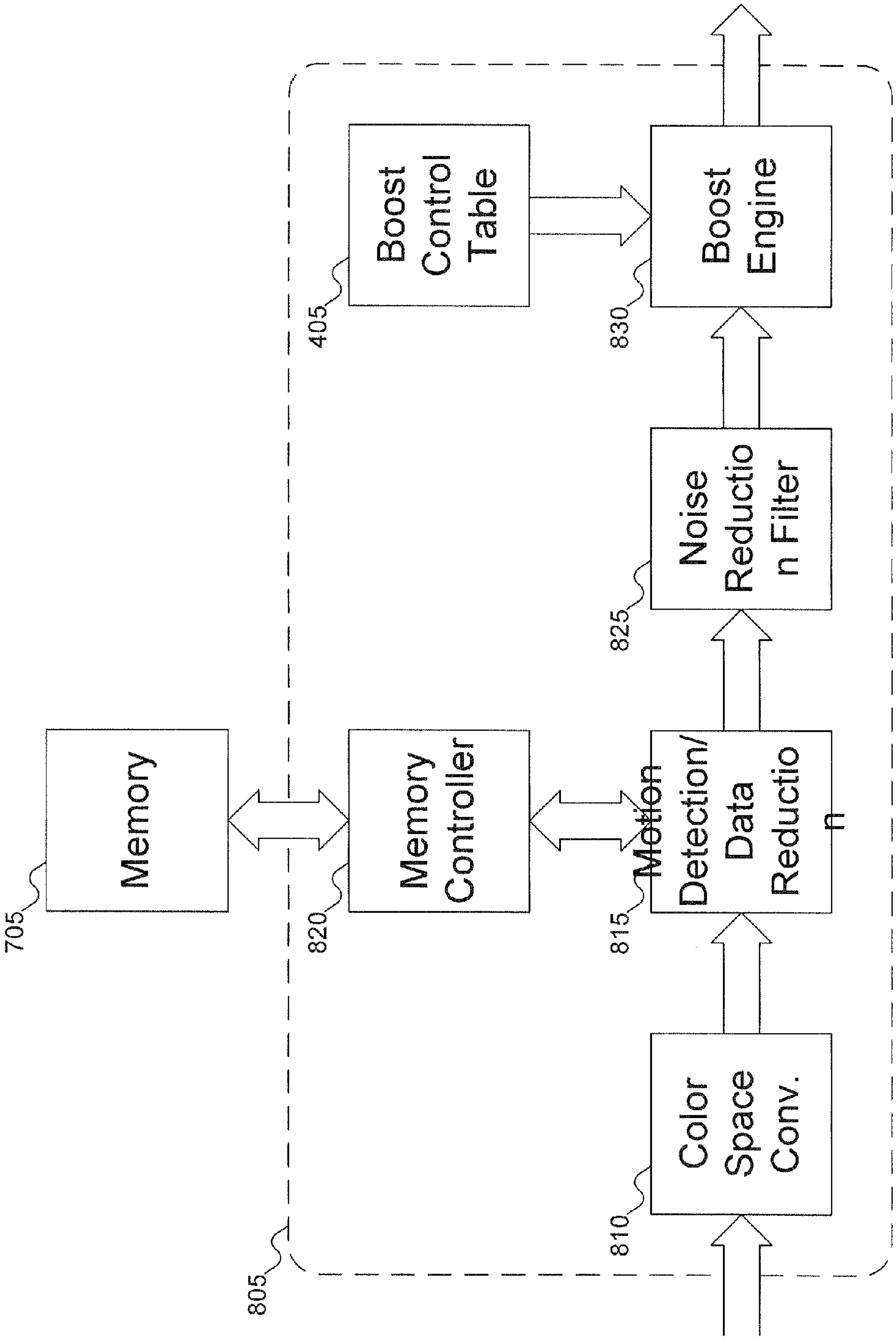
FIG. 8 shows a high-level block diagram of a hardware configuration that can be used to manage boost values, according to an embodiment of the invention.

FIG. 8 shows a high-level block diagram of a hardware configuration that can be used to manage boost values, according to an embodiment of the invention. In FIG. 8, element 805 is responsible for receiving the frame information, accessing the boost table, and adjusting the target pixel levels as needed.

Color space converter 810 is responsible for receiving the pixel information as input and performing a color space conversion. Color space conversion is not absolutely necessary, but it can reduce the bandwidth required when accessing memory. This is because different color spaces require different amounts of data to represent the same information (albeit with potential losses in the data quality as a result of conversion).

Figure 9:
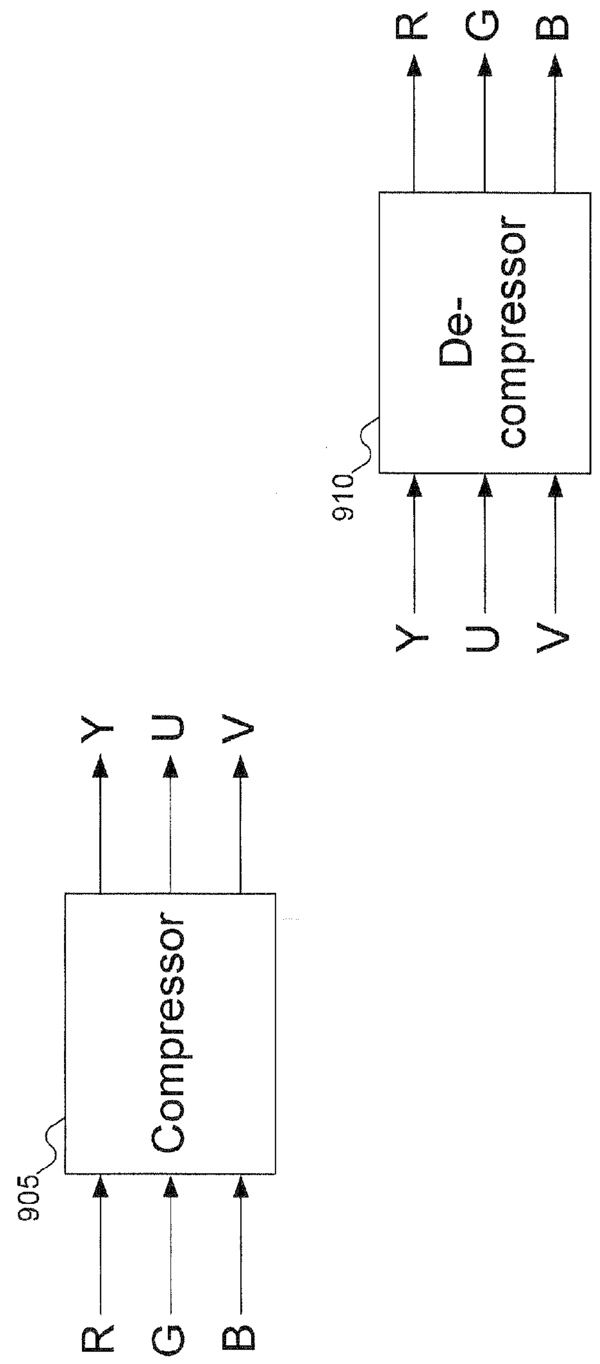
FIG. 9 shows a compressor and a decompressor that can be used to compress the pixel levels, according to an embodiment of the invention.

Consider, for example, compressor 905 in FIG. 9. When pixel data is stored using a red-green-blue color space, typically eight bits are dedicated for each of the three colors (although a person skilled in the art will recognize that more or fewer than eight bits can be used for each color), for a total of 24 bits. In contrast, when a Y-U-V color scheme is used, eight bits are used to encode the Y information, but only four bits are needed for the U and V information, for a total of 16 bits. While less information is stored using Y-U-V than with red-green-blue, the information that is lost is typically information that the human eye has a difficult time detecting. In other words, the human eye does not notice the lost information. Thus by compressing from the red-green-blue color space to the Y-U-V color space, a 33% reduction in bandwidth can be achieved. (It is true that some processing time is spent performing the color space conversion, but the extra processing required is still more than offset by the advantages of the reduced bandwidth.) Similarly, de-compressor 910 takes Y-U-V color space information and restores it to the red-green-blue color space. Although information might have been lost in compressing to the Y-U-V color space, de-compressing does not result in a loss of data (although decompression cannot restore information that was lost in an earlier red-green-blue to Y-U-V color space compression).

Returning to FIG. 8, motion detector 815 is responsible for detecting motion in the video. If it turns out that there is no motion in the video (that is, pixels are not changing levels), then there is no need for determining a boost value, simplifying the operation of the device. To perform motion detection, motion detector interfaces with memory 705 via memory controller 820: motion detection relies on comparing the consecutive values of individual pixels, which means that individual frames of video need to be stored in memory for comparison purposes. Different motion detectors can be used, with different thresholds (that is, different sensitivities) to motion.

Noise reduction filter 825 is responsible for reducing any noise in the signal. Noise in the signal might result in pixels have different levels, even though there is no actual motion in the video. Without noise reduction, the noise might be amplified by the boost, which would not be desirable. Different noise reduction filters can be used as desired: each noise reduction filter can use different thresholds (that is, have different sensitivities) to noise. Once the question of motion detection and noise reduction have been addressed, boost engine 830 can use boost table 405 to compute the boost value and to adjust the target pixel level accordingly, which becomes the output of element 805.

Figure 10A:
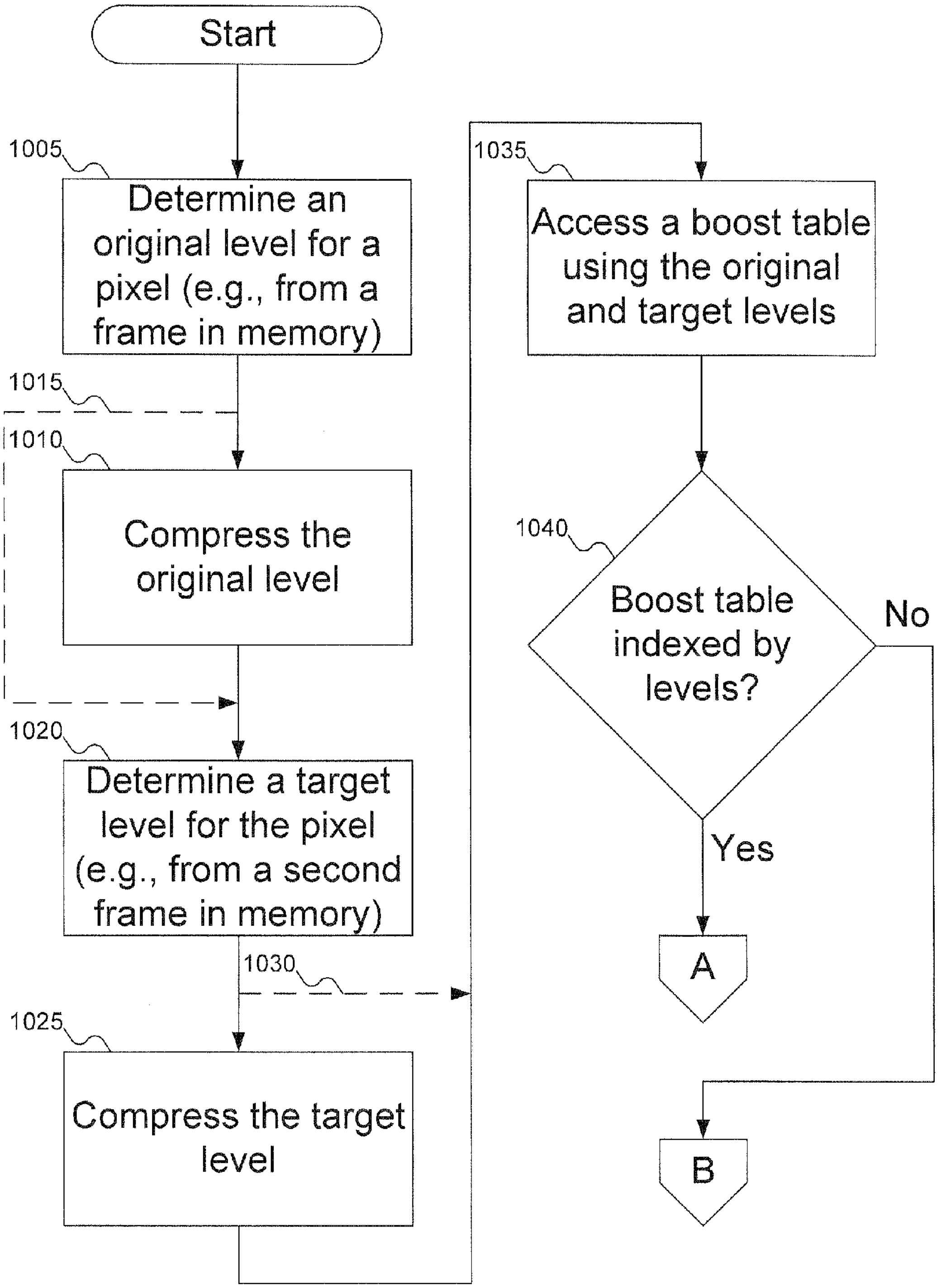
FIGS. 10A-10B show a flowchart of the procedure for determining a boost value for a target pixel level, according to an embodiment of the invention.
Figure 10B:
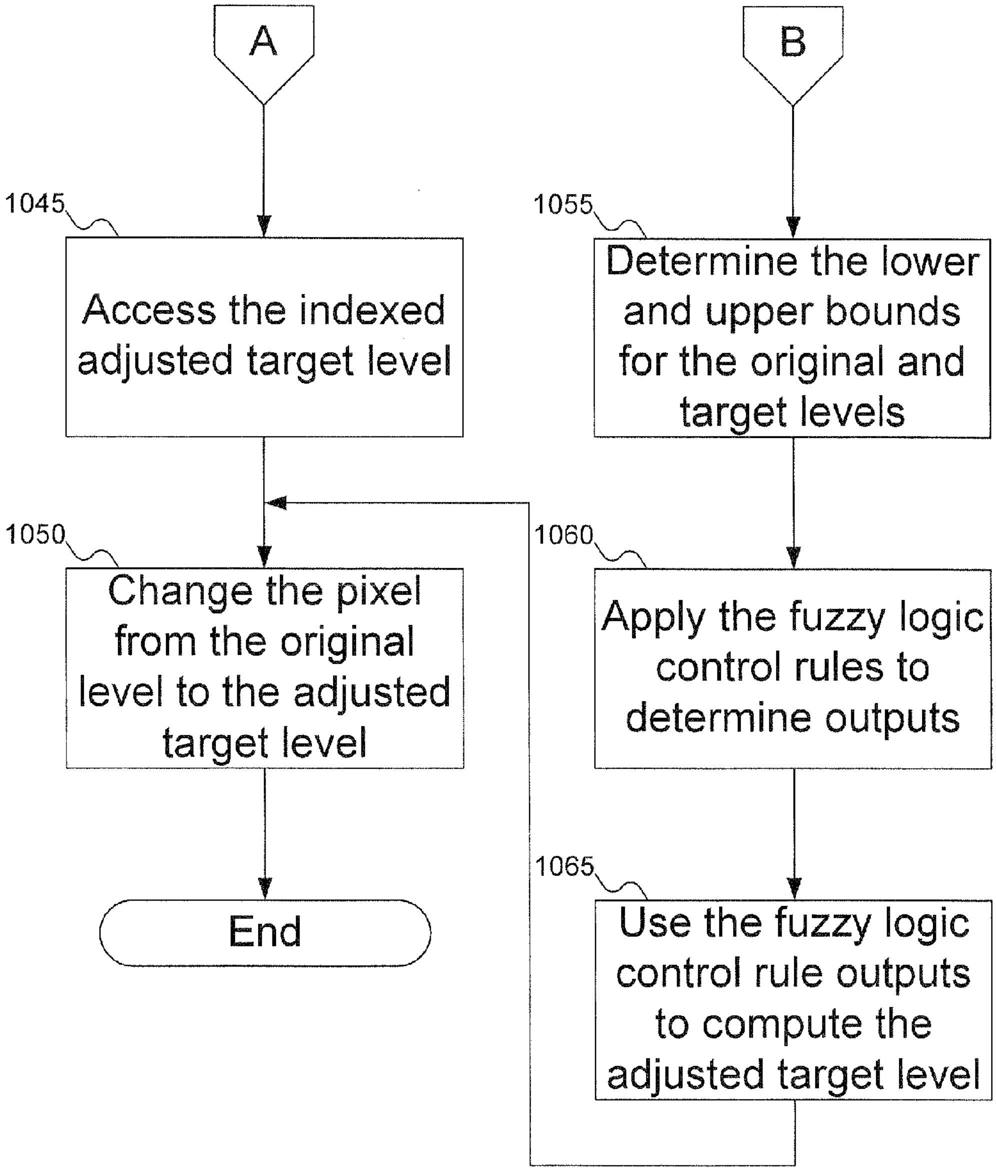

FIGS. 10A-10B show a flowchart of the procedure for determining a boost value for a target pixel level, according to an embodiment of the invention. In FIG. 10A, at step 1005, an original level is determined for a pixel. At step 1010, the original level is compressed, if desired. As shown by arrow 1015, step 1010 can be omitted. At step 1020, a target level for the pixel is determined. At step 1025, the target level is compressed, if desired. As shown by arrow 1030, step 1025 can be omitted. At step 1035, a boost table is accessed using the original and target pixel levels. At step 1040, the system determines if the boost table includes a value indexed by the original and target pixel levels.

If the boost table includes an adjusted target level indexed by the original and target pixel levels, then at step 1045 (FIG. 10B), the indexed adjusted target level is accessed. Finally, at step 1050, the pixel is changed from the original level to the adjusted target level.

If the boost table does not include an adjusted target level indexed by the original and target pixel levels, then at step 1055, the system determines the lower and upper bounds for the original and target pixel levels. This defines the box (see FIG. 5) within which the boost value lies. At step 1060, the system applies the appropriate fuzzy logic control rules to determine the outputs, and at step 1065 the system uses the outputs to compute the de-fuzzified adjusted target level. Processing then continues with step 1050.

The following discussion is intended to provide a brief, general description of a suitable machine (i.e., projector) in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:

a boost table, the boost table including a plurality of values, each value in the boost table indexed by a first index and a second index, the first index including a first lower bound and a first upper bound for an original pixel level, the first lower bound and the first upper bound consecutive first indices in the boost table, and the second index including a second lower bound and a second upper bound for a target pixel level, the second lower bound and the second upper bound consecutive second indices in the boost table, the value representing an adjustment to said original pixel level when transitioning from said original pixel level to said target pixel level;

the apparatus further comprises a non-transitory storage medium including fuzzy logic control rules usable with the first lower bound, the second lower bound, the first upper bound, and the second upper bound to produce results of the fuzzy logic control rules, said results of the fuzzy logic control rules used to determine said adjustment to said original pixel level the fuzzy logic control rules include the rules:

if the original pixel level is in $A(x)=1-x$, then said result is the value in the boost table with indices of the first lower bound and the second upper bound;

if the original pixel level and the target pixel level are in $B(x,y)=x-y$, then said result is the value in the boost table with indices of the first upper bound and the second upper bound;

if the target pixel level is in $C(y)=y$, then said result is the value in the boost table with indices of the first lower bound and the second lower bound; and a display operative to use the boost table and the fuzzy logic control rules to use the value in transitioning a pixel from said original pixel level to said target pixel level.

2. An apparatus according to claim 1, wherein the fuzzy logic control rules include the rules:

if the original pixel level is in $D(x)=x$, then said result is the value in the boost table with indices of the first lower bound and the second lower bound;

if the original pixel level and the target pixel level are in $E(x,y)=y-x$, then said result is the value in the boost table with indices of the first lower bound and the second lower bound;

if the target pixel level is in $F(y)=1-y$, then said result is the value in the boost table with indices of the first lower bound and the second upper bound.

3. An apparatus according to claim 1, further comprising a defuzzifier to compute a centroid of an output fuzzy set from the results of the fuzzy logic control rules; and defuzzify the centroid to produce said adjustment to said original pixel level.

4. An apparatus according to claim 1, further comprising a memory to store a first frame and a second frame for display on the display, said first frame including a pixel with said original pixel level, and said second frame including the pixel with said target pixel level.

5. An apparatus according to claim 4, further comprising a motion detector to use the boost table to produce said adjustment to said original pixel level when motion is detected between said first frame and said second frame.

6. An apparatus according to claim 1, wherein said adjustment to said original pixel level includes an adjusted target pixel level.

7. An apparatus according to claim 1, wherein said adjustment to said original pixel level includes a boost value to be added to said original pixel level.

8. A method for improving pixel performance in a display, comprising:

determining an original pixel level for a pixel in a first frame;

determining a target pixel level for the pixel in a second frame;

accessing a boost table using the original pixel level and the target pixel level to determine an adjustment to the original pixel level, including:

determining a first lower bound and a first upper bound for the original pixel level, the first lower bound and the first upper bound consecutive first indices in the boost table;

determining a second lower bound and a second upper bound for the target pixel level, the second lower bound and the second upper bound consecutive second indices in the boost table;

using fuzzy logic control rules and the first lower bound, the second lower bound, the first upper bound, and the second upper bound to produce results of the fuzzy logic control rules, including, if the target pixel level is in an upper portion of the area bounded by the first lower bound, the second lower bound, the first upper bound, and the second upper bound, applying the control rules:

if the original pixel level is in A(x)=1−x, then the result is the value in the boost table with indices of the first lower bound and the second upper bound;

if the original pixel level and the target pixel level are in B(x,y)=x−y, then the result is the value in the boost table with indices of the first upper bound and the second upper bound;

if the target pixel level is in C(y)=y, then the result is the value in the boost table with indices of the first lower bound and the second lower bound; and using the results of the fuzzy logic control rules to determine the adjustment to the original pixel level; and using the adjustment to the original pixel level to improve pixel performance on the display.

9. A method according to claim 8, wherein:

accessing a boost table using the original pixel level and the target pixel level to determine an adjustment to the original pixel level includes accessing the boost table using the original pixel level and the target pixel level to determine an adjusted target pixel level; and using the adjustment to the original pixel level to improve pixel performance includes replacing the target pixel level for the pixel with the adjusted target pixel level.

10. A method according to claim 8, wherein using fuzzy logic control rules includes, if the target pixel level is in a lower portion of the area bounded by the first lower bound, the second lower bound, the first upper bound, and the second upper bound, applying the control rules:

if the original pixel level is in D(x)=x, then the result is the value in the boost table with indices of the first lower bound and the second lower bound;

if the original pixel level and the target pixel level are in E(x,y)=y−x, then the result is the value in the boost table with indices of the first lower bound and the second lower bound;

if the target pixel level is in F(y)=1−y, then the result is the value in the boost table with indices of the first lower bound and the second upper bound.

11. A method according to claim 8, wherein using fuzzy logic control rules includes:

computing a centroid of an output fuzzy set from the results of the fuzzy logic control rules; and defuzzifying the centroid to produce the adjustment to the original pixel level.

12. A method according to claim 11, wherein defuzzifying the centroid includes applying a weighted average of the outputs of the fuzzy logic control rules to compute the adjustment to the original pixel level.

13. A method according to claim 8, wherein:

determining an original pixel level includes reading the original pixel level for the pixel in the first frame from a memory; and determining a target pixel level includes reading the target pixel level for the pixel in the second frame from the memory.

14. An article comprising a non-transitory machine-accessible media having associated data, wherein the data, when accessed, results in a machine performing:

determining an original pixel level for a pixel in a first frame;

determining a target pixel level for the pixel in a second frame;

accessing a boost table using the original pixel level and the target pixel level to determine an adjustment to the original pixel level, including:

determining a first lower bound and a first upper bound for the original pixel level, the first lower bound and the first upper bound consecutive first indices in the boost table;

determining a second lower bound and a second upper bound for the target pixel level, the second lower bound and the second upper bound consecutive second indices in the boost table;

using fuzzy logic control rules and the first lower bound, the second lower bound, the first upper bound, and the second upper bound to produce results of the fuzzy logic control rules, including, if the target pixel level is in an upper portion of the area bounded by the first lower bound, the second lower bound, the first upper bound, and the second upper bound, applying the control rules:

if the original pixel level is in A(x)=1−x, then the result is the value in the boost table with indices of the first lower bound and the second upper bound;

if the original pixel level and the target pixel level are in B(x,y)=x−y, then the result is the value in the boost table with indices of the first upper bound and the second upper bound;

if the target pixel level is in C(y)=y, then the result is the value in the boost table with indices of the first lower bound and the second lower bound; and using the results of the fuzzy logic control rules to determine the adjustment to the original pixel level; and using the adjustment to the original pixel level to improve pixel performance.

15. An article according to claim 14, wherein:

accessing a boost table using the original pixel level and the target pixel level to determine an adjustment to the original pixel level includes accessing the boost table using the original pixel level and the target pixel level to determine an adjusted target pixel level; and using the adjustment to the original pixel level to improve pixel performance includes replacing the target pixel level for the pixel with the adjusted target pixel level.

16. An article according to claim 14, wherein using fuzzy logic control rules includes, if the target pixel level is in a lower portion of the area bounded by the first lower bound, the second lower bound, the first upper bound, and the second upper bound, applying the control rules:

if the original pixel level is in D(x)=x, then the result is the value in the boost table with indices of the first lower bound and the second lower bound;

if the original pixel level and the target pixel level are in E(x,y)=y−x, then the result is the value in the boost table with indices of the first lower bound and the second lower bound;

if the target pixel level is in F(y)=1−y, then the result is the value in the boost table with indices of the first lower bound and the second upper bound.

17. An article according to claim 14, wherein using fuzzy logic control rules includes:

computing a centroid of an output fuzzy set from the results of the fuzzy logic control rules; and defuzzifying the centroid to produce the adjustment to the original pixel level.

18. An article according to claim 17, wherein defuzzifying the centroid includes applying a weighted average of the outputs of the fuzzy logic control rules to compute the adjustment to the original pixel level.

19. An article according to claim 14, wherein:

determining an original pixel level includes reading the original pixel level for the pixel in the first frame from a memory; and determining a target pixel level includes reading the target pixel level for the pixel in the second frame from the memory.

20. An apparatus, comprising:

a boost table, the boost table including a plurality of values, each value in the boost table indexed by a first index and a second index, the first index including a first lower bound and a first upper bound for an original pixel level, the first lower bound and the first upper bound consecutive first indices in the boost table, and the second index including a second lower bound and a second upper bound for a target pixel level, the second lower bound and the second upper bound consecutive second indices in the boost table, the value representing an adjustment to said original pixel level when transitioning from said original pixel level to said target pixel level;

the apparatus further comprises a non-transitory storage medium including fuzzy logic control rules usable with the first lower bound, the second lower bound, the first upper bound, and the second upper bound to produce results of the fuzzy logic control rules, said results of the fuzzy logic control rules used to determine said adjustment to said original pixel level the fuzzy logic control rules include the rules:

if the original pixel level is in $D(x)=x$, then said result is the value in the boost table with indices of the first lower bound and the second lower bound;

if the original pixel level and the target pixel level are in $E(x,y)=y-x$, then said result is the value in the boost table with indices of the first lower bound and the second lower bound;

if the target pixel level is in $F(y)=1-y$, then said result is the value in the boost table with indices of the first lower bound and the second upper bound; and a display operative to use the boost table and the fuzzy logic control rules to use the value in transitioning a pixel from said original pixel level to said target pixel level.

21. An apparatus according to claim 20, further comprising a defuzzifier to compute a centroid of an output fuzzy set from the results of the fuzzy logic control rules; and defuzzify the centroid to produce said adjustment to said original pixel level.

22. An apparatus according to claim 20, further comprising a memory to store a first frame and a second frame for display on the display, said first frame including a pixel with said original pixel level, and said second frame including the pixel with said target pixel level.

23. An apparatus according to claim 22, further comprising a motion detector to use the boost table to produce said adjustment to said original pixel level when motion is detected between said first frame and said second frame.

24. An apparatus according to claim 20, wherein said adjustment to said original pixel level includes an adjusted target pixel level.

25. An apparatus according to claim 20, wherein said adjustment to said original pixel level includes a boost value to be added to said original pixel level.

26. A method for improving pixel performance in a display, comprising:

determining an original pixel level for a pixel in a first frame;

determining a target pixel level for the pixel in a second frame;

accessing a boost table using the original pixel level and the target pixel level to determine an adjustment to the original pixel level, including:

determining a first lower bound and a first upper bound for the original pixel level, the first lower bound and the first upper bound consecutive first indices in the boost table;

determining a second lower bound and a second upper bound for the target pixel level, the second lower bound and the second upper bound consecutive second indices in the boost table;

using fuzzy logic control rules and the first lower bound, the second lower bound, the first upper bound, and the second upper bound to produce results of the fuzzy logic control rules, including, if the target pixel level is in an upper portion of the area bounded by the first lower bound, the second lower bound, the first upper bound, and the second upper bound, applying the control rules:

if the original pixel level is in $D(x)=x$, then the result is the value in the boost table with indices of the first lower bound and the second lower bound;

if the original pixel level and the target pixel level are in $E(x,y)=y-x$, then the result is the value in the boost table with indices of the first lower bound and the second lower bound;

if the target pixel level is in $F(y)=1-y$, then the result is the value in the boost table with indices of the first lower bound and the second upper bound; and using the results of the fuzzy logic control rules to determine the adjustment to the original pixel level; and using the adjustment to the original pixel level to improve pixel performance on the display.

27. A method according to claim 26, wherein:

accessing a boost table using the original pixel level and the target pixel level to determine an adjustment to the original pixel level includes accessing the boost table using the original pixel level and the target pixel level to determine an adjusted target pixel level; and using the adjustment to the original pixel level to improve pixel performance includes replacing the target pixel level for the pixel with the adjusted target pixel level.

28. A method according to claim 26, wherein using fuzzy logic control rules includes:

computing a centroid of an output fuzzy set from the results of the fuzzy logic control rules; and defuzzifying the centroid to produce the adjustment to the original pixel level.

29. A method according to claim 28, wherein defuzzifying the centroid includes applying a weighted average of the outputs of the fuzzy logic control rules to compute the adjustment to the original pixel level.

30. A method according to claim 26, wherein:

determining an original pixel level includes reading the original pixel level for the pixel in the first frame from a memory; and determining a target pixel level includes reading the target pixel level for the pixel in the second frame from the memory.

31. An article comprising a non-transitory machine-accessible media having associated data, wherein the data, when accessed, results in a machine performing:

determining an original pixel level for a pixel in a first frame;

determining a target pixel level for the pixel in a second frame;

accessing a boost table using the original pixel level and the target pixel level to determine an adjustment to the original pixel level, including:

determining a first lower bound and a first upper bound for the original pixel level, the first lower bound and the first upper bound consecutive first indices in the boost table;

determining a second lower bound and a second upper bound for the target pixel level, the second lower bound and the second upper bound consecutive second indices in the boost table;

using fuzzy logic control rules and the first lower bound, the second lower bound, the first upper bound, and the second upper bound to produce results of the fuzzy logic control rules, including, if the target pixel level is in an upper portion of the area bounded by the first lower bound, the second lower bound, the first upper bound, and the second upper bound, applying the control rules:

if the original pixel level is in D(x)=x, then the result is the value in the boost table with indices of the first lower bound and the second lower bound;

if the original pixel level and the target pixel level are in E(x,y)=y−x, then the result is the value in the boost table with indices of the first lower bound and the second lower bound;

if the target pixel level is in F(y)=1−y, then the result is the value in the boost table with indices of the first lower bound and the second upper bound; and using the results of the fuzzy logic control rules to determine the adjustment to the original pixel level; and using the adjustment to the original pixel level to improve pixel performance.

32. An article according to claim 31, wherein:

accessing a boost table using the original pixel level and the target pixel level to determine an adjustment to the original pixel level includes accessing the boost table using the original pixel level and the target pixel level to determine an adjusted target pixel level; and using the adjustment to the original pixel level to improve pixel performance includes replacing the target pixel level for the pixel with the adjusted target pixel level.

33. An article according to claim 31, wherein using fuzzy logic control rules includes:

computing a centroid of an output fuzzy set from the results of the fuzzy logic control rules; and defuzzifying the centroid to produce the adjustment to the original pixel level.

34. An article according to claim 33, wherein defuzzifying the centroid includes applying a weighted average of the outputs of the fuzzy logic control rules to compute the adjustment to the original pixel level.

35. An article according to claim 31, wherein:

determining an original pixel level includes reading the original pixel level for the pixel in the first frame from a memory; and determining a target pixel level includes reading the target pixel level for the pixel in the second frame from the memory.

* * * * *

UNITED STATES PATENT AND TRADEMARK OFFICE

CERTIFICATE OF CORRECTION

PATENT NO. : 8,004,544 B1
APPLICATION NO. : 11/867628
DATED : August 23, 2011
INVENTOR(S) : Hongmin Zhang et al.

It is certified that error appears in the above-identified patent and that said Letters Patent is hereby corrected as shown below:

In the Specification

On column 4, line 65, the word “alter” should read --after--;
On column 5, line 27, the word “hits” should read --bits--.

Signed and Sealed this
First Day of October, 2013

Teresa Stanek Rea
*Deputy Director of the United States Patent and Trademark Office*